United States Patent
Takahashi

(10) Patent No.: US 8,307,303 B2
(45) Date of Patent: Nov. 6, 2012

(54) ORDER TERMINAL, COMPUTER-READABLE STORAGE MEDIUM, AND ORDER METHOD

(75) Inventor: Isao Takahashi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/509,560

(22) Filed: Jul. 27, 2009

(65) Prior Publication Data

US 2010/0031195 A1 Feb. 4, 2010

(30) Foreign Application Priority Data

Jul. 31, 2008 (JP) .................................. 2008-198974

(51) Int. Cl.
*G06F 3/048* (2006.01)
(52) U.S. Cl. .............................. 715/810; 705/15; 705/16
(58) Field of Classification Search .......... 715/705–715, 715/716, 719, 727–729, 773, 775, 780, 783, 715/810, 811, 816–820, 825, 828, 835, 844–845, 715/855, 863, 866; 705/15, 16, 26.1, 27.1, 705/28
See application file for complete search history.

(56) References Cited

U.S. PATENT DOCUMENTS

| | | | | |
|---|---|---|---|---|
| 6,370,513 | B1 * | 4/2002 | Kolawa et al. | 705/7.33 |
| 6,646,659 | B1 * | 11/2003 | Brown et al. | 715/811 |
| 2002/0026363 | A1 * | 2/2002 | Dunaway, Jr. | 705/15 |
| 2003/0171944 | A1 * | 9/2003 | Fine et al. | 705/1 |
| 2003/0208409 | A1 * | 11/2003 | Mault | 705/26 |
| 2004/0073489 | A1 * | 4/2004 | Varatharajah et al. | 705/23 |
| 2004/0103033 | A1 * | 5/2004 | Reade et al. | 705/16 |
| 2005/0065851 | A1 * | 3/2005 | Aronoff et al. | 705/15 |
| 2007/0033535 | A1 * | 2/2007 | Cornacchia, III | 715/762 |
| 2007/0191689 | A1 * | 8/2007 | Elitok | 600/300 |
| 2008/0059323 | A1 * | 3/2008 | Chang et al. | 705/26 |
| 2009/0150241 | A1 * | 6/2009 | Laboise | 705/14 |
| 2009/0192898 | A1 * | 7/2009 | Baril | 705/14 |

FOREIGN PATENT DOCUMENTS

JP 2006-079209 3/2006

* cited by examiner

*Primary Examiner* — Weilun Lo
*Assistant Examiner* — Enrique Iturralde
(74) *Attorney, Agent, or Firm* — Turocy & Watson, LLP

(57) ABSTRACT

A control unit that controls an LCD with touch panel allows a user to designate a desired raw material with a touch panel, causes the LCD to display menu items not containing the designated raw material, allows the user to designate a desired menu item with the touch panel from the menu items displayed on the LCD, and generates order data including the designated menu item.

9 Claims, 18 Drawing Sheets

| ALLERGEN CODE | ALLERGEN NAME |
|---|---|
| 1 | WHEAT |
| 2 | SOBA |
| 3 | EGG |
| 4 | MILK |
| 5 | PEANUTS |
| 6 | ABALONE |
| 7 | SQUID |
| 8 | SALMON ROE |
| 9 | SHRIMP |
| 10 | ORANGE |
| 11 | CRAB |
| 12 | KIWI FRUIT |
| 13 | BEEF |
| 14 | WALNUT |
| 15 | SALMON |
| 16 | MACKEREL |
| 17 | SOYBEAN |
| 18 | CHICKEN |
| 19 | PORK |
| 20 | MATSUTAKE |
| 21 | PEACH |
| 22 | YAM |
| 23 | APPLE |
| 24 | GELATIN |

Fig. 7

| MENU CODE | MENU ITEM | UNIT PRICE | ALLERGEN CODE | HOST MENU |
|---|---|---|---|---|
| XXXXXX | CORN SOUP | XXX | 3 (EGG), 4 (MILK) | . . . |
| XXXXXX | CLAM CHOWDER | XXX | 4 (MILK) | . . . |
| XXXXXX | TOMATO SOUP | XXX | – | . . . |
| XXXXXX | SEAFOOD SOUP | XXX | 3 (SQUID), 4 (SHRIMP) | . . . |
| XXXXXX | SEAFOOD SALAD | XXX | 9 (SHRIMP) | SALAD |
| XXXXXX | CAESAR SALAD | XXX | 1 (WHEAT) | SALAD |
| XXXXXX | JAPANESE SALAD | XXX | 18 (CHICKEN) | SALAD |
| XXXXXX | CHINESE SALAD | XXX | 19 (PORK) | SALAD |
| XXXXXX | ITALIAN SALAD | XXX | 14 (WALNUT) | SALAD |
| XXXXXX | ROAST BEEF | XXX | – | . . . |
| XXXXXX | SIRLOIN | XXX | – | . . . |
| XXXXXX | ITALIAN SEAFOOD | XXX | 9 (SHRIMP) | . . . |
| XXXXXX | KAISEKI | XXX | 20 (MATSUTAKE) | . . . |
| XXXXXX | VEAL SAUTÉ | XXX | – | . . . |
| XXXXXX | MILLEFEUILLE | XXX | 3 (EGG), 4 (MILK) | . . . |
| XXXXXX | STRAWBERRY CAKE | XXX | 3 (EGG), 4 (MILK) | . . . |
| XXXXXX | MONT BLANC | XXX | 3 (EGG), 4 (MILK) | . . . |
| XXXXXX | ICE CREAM CAKE | XXX | 3 (EGG), 4 (MILK) | . . . |
| XXXXXX | CHOCOLATE CAKE | XXX | 3 (EGG), 4 (MILK) | . . . |
| XXXXXX | SPECIAL COURSE | XXX | – | . . . |
| XXXXXX | GORGEOUS COURSE | XXX | – | . . . |
| XXXXXX | CELEBRITY COURSE | XXX | – | . . . |
| XXXXXX | SET MENU A | XXX | 3 (EGG), 4 (MILK), 7 (SQUID), 9 (SHRIMP) | . . . |
| XXXXXX | SET MENU B | XXX | – | . . . |

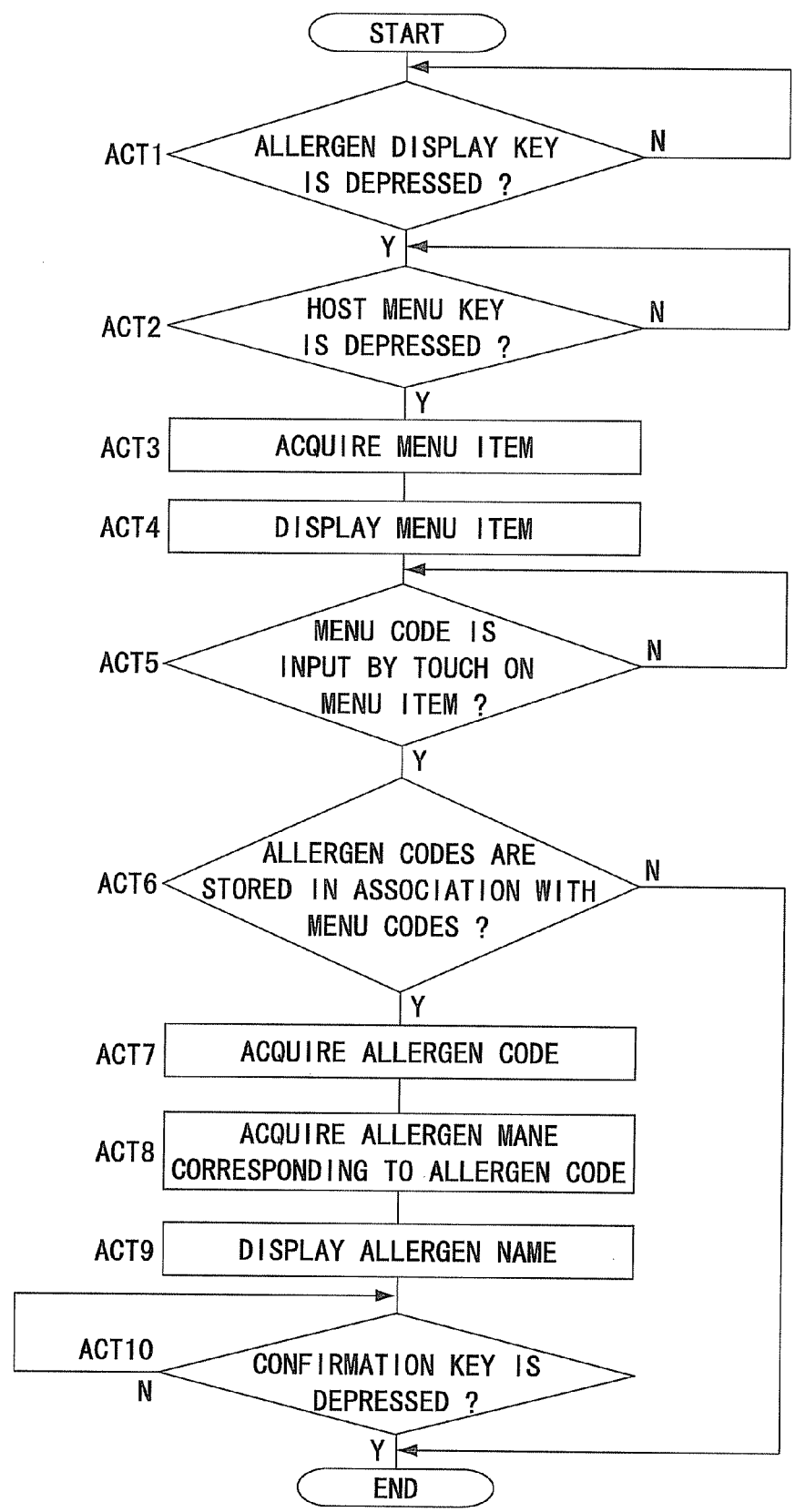

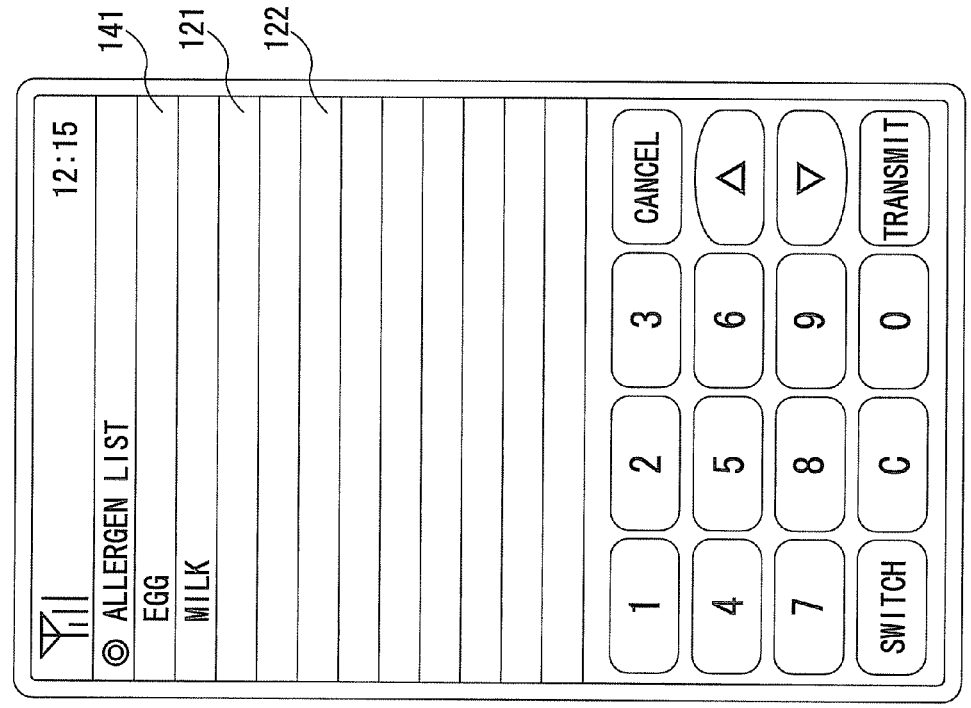
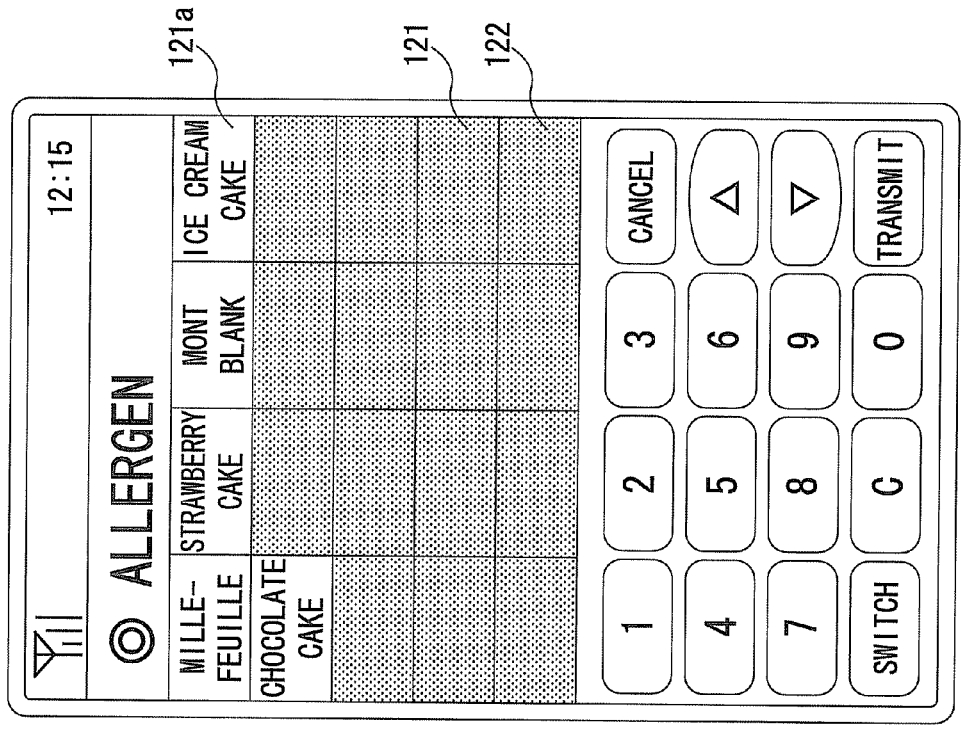

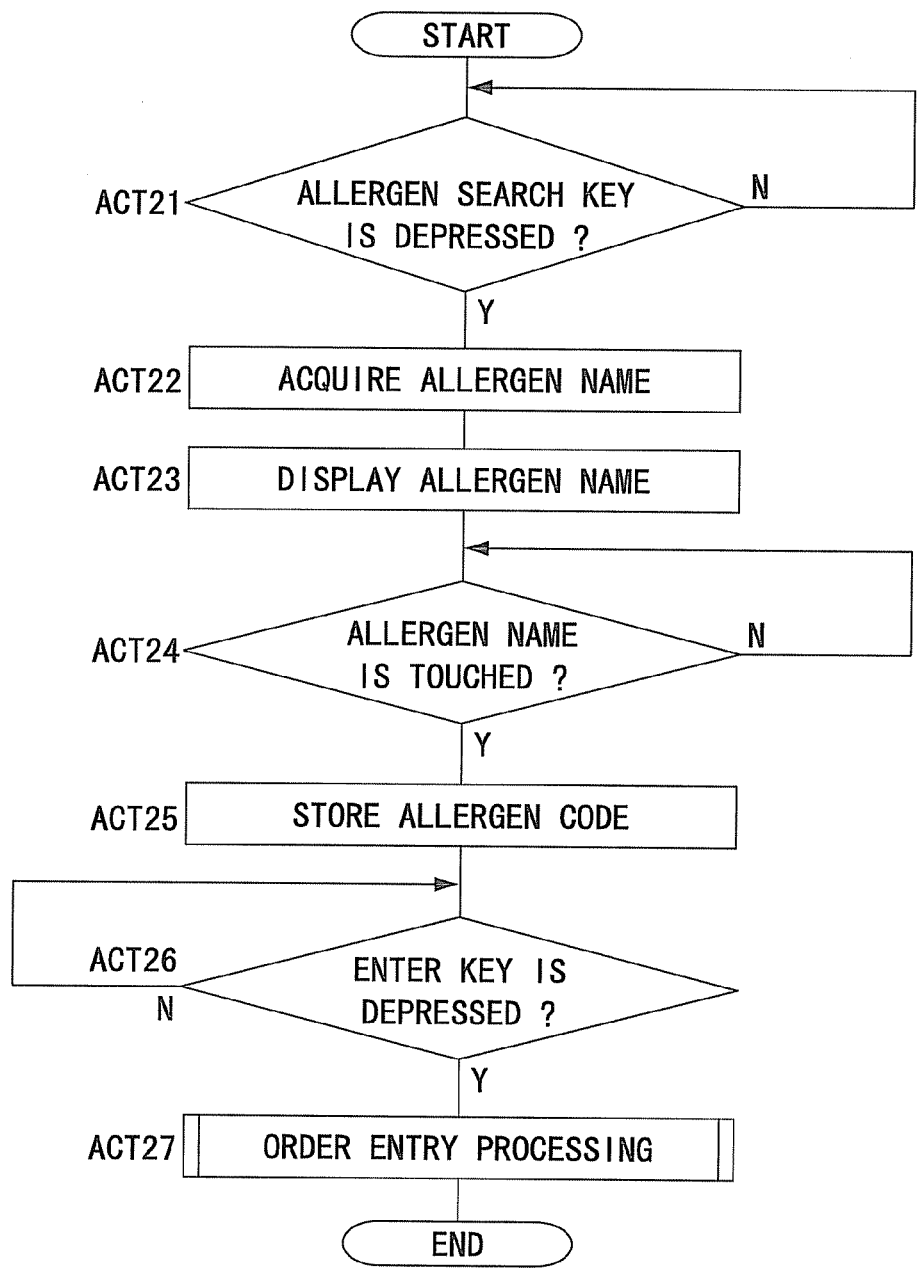

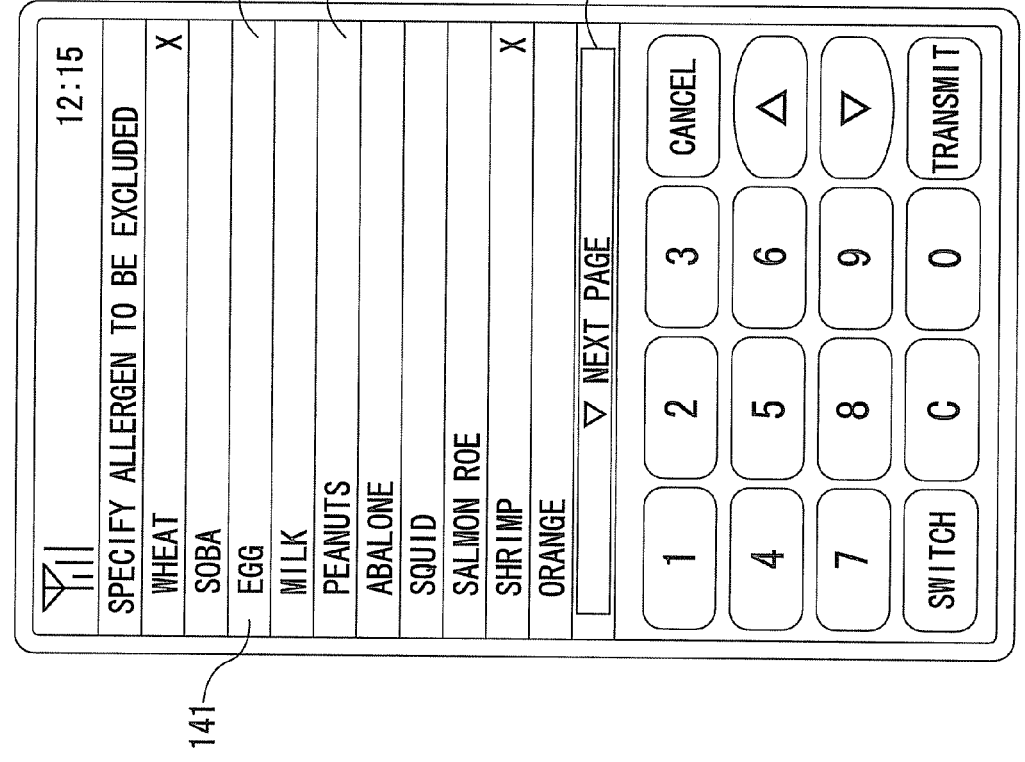
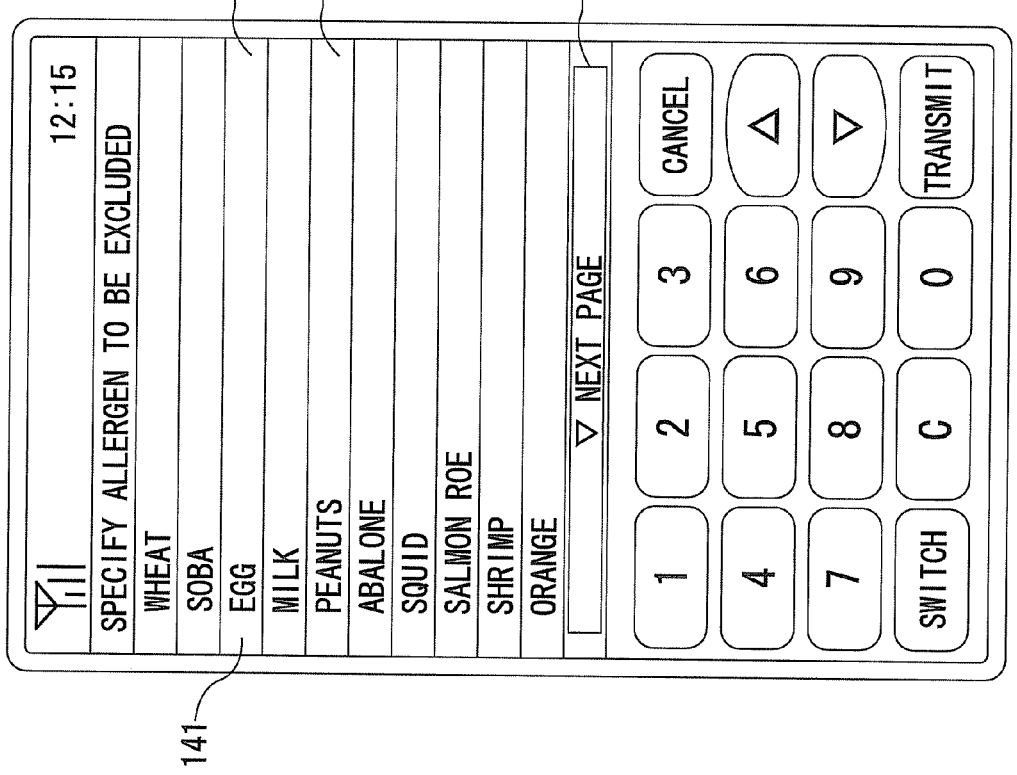

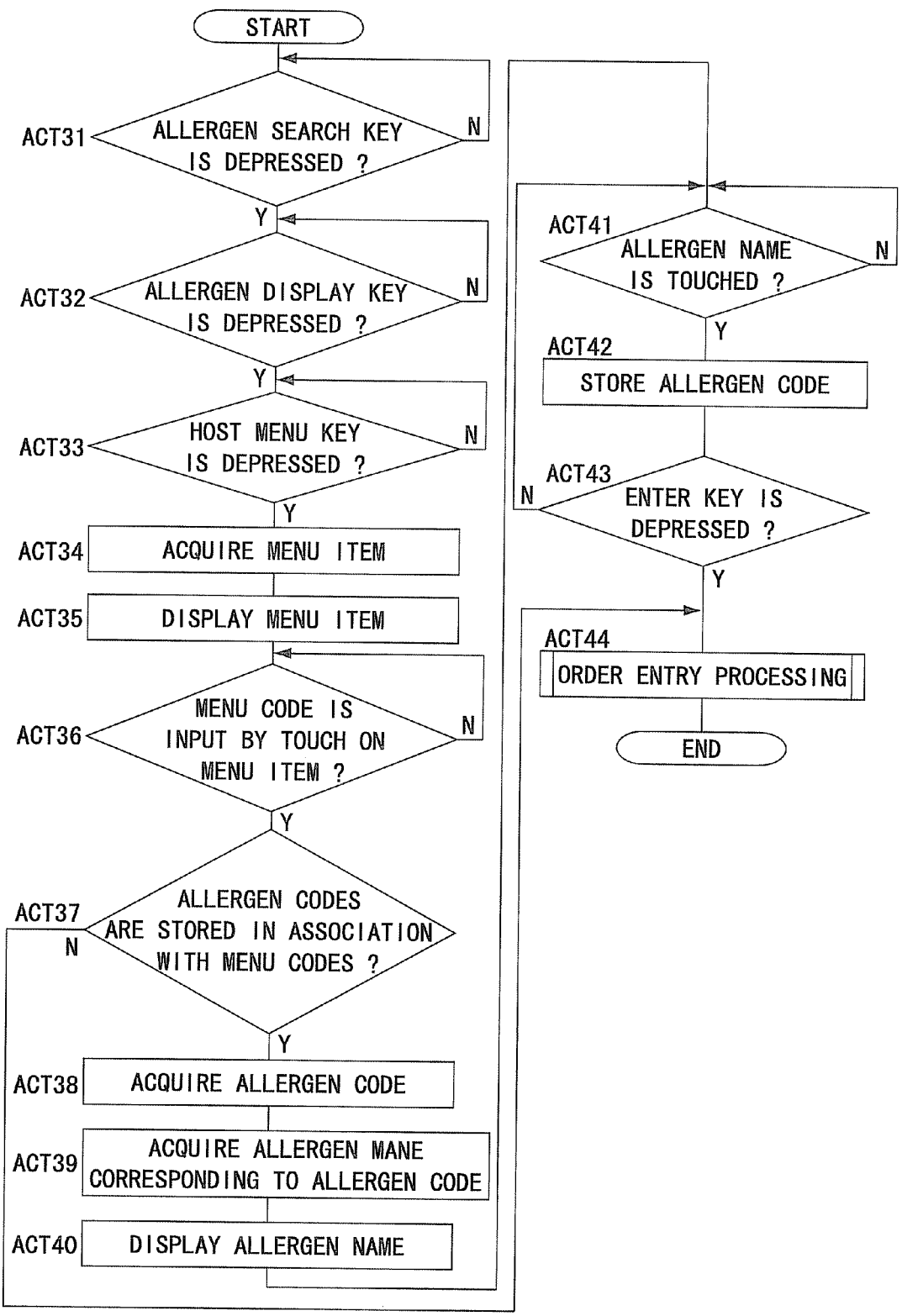

ALLERGEN LIST

| ALLERGEN NAME |
|---|
| SOBA |
| MILK |
| EGG |
| WHEAT |
| PEANUTS |

CONFIRM

REGISTER[BUSINESS DATE:FEB. 16, 2007]
TOTAL NUMBER OF ITEMS
NUMBER OF CUSTOMERS
ATTENDANT
TABLE NO.

2007 02/20 TUESDAY 10:34

ALLERGEN
M1

TOTAL
BLEND OF
CAFÉ LA THÉ
MELON FLOAT
ICE COFFEE
OOLONG TEA

NUMBER OF CUSTOMERS ▷
A LA CARTE
TO PAGE 2 ▷
SFKC 2

PAUSE
ATTENDANT
RECEIPT
MONEY EXCHANGE
SALES PROMPT REPORT
SELECT JOB
SUBTOTAL 9  6  3  TEN THOUSAND YEN BILL
8  5  2
      00

141
303
304
311
145
131d

Fig. 16A (rotated sideways form — POS register screen)

- 2007 02/20 TUESDAY 10:34
- REGISTER [BUSINESS DATE: FEB. 16, 2007]
- TOTAL NUMBER OF ITEMS
- NUMBER OF CUSTOMERS
- ATTENDANT
- TABLE NO.
- M1
- ALLERGEN
- PLEASE SELECT ALLERGEN TO BE EXCLUDED AND PRESS [CONFIRM].
- WHEN YOU STOP INPUT, PLEASE PRESS [LAST ITEM CORRECTION].

| ALLERGEN NAME | |
|---|---|
| SOBA | |
| MILK | × |
| EGG | |
| WHEAT | × |
| PEANUTS | × |

- TOTAL
- BLEND OF
- CAFÉ LA THÉ
- MELON FLOAT
- ICE COFFEE
- OOLONG TEA
- LAST ITEM CORRECTION
- CONFIRM
- PAUSE
- ATTENDANT
- RECEIPT
- MONEY EXCHANGE
- SALES PROMPT REPORT
- SELECT JOB
- SUBTOTAL
- NUMBER OF CUSTOMERS
- A LA CARTE
- SFKC 2
- TO PAGE 2
- 9, 6, 3, TEN THOUSAND YEN BILL
- 8, 5, 2, 00

Labels: 303, 304, 311, 145, 131d, 141

Fig. 16B

ORDER TERMINAL, COMPUTER-READABLE STORAGE MEDIUM, AND ORDER METHOD

CROSS REFERENCE TO RELATED APPLICATION

The present application is based on Japanese Priority Document P2008-198974 filed on Jul. 31, 2008, the content of which is incorporated herein by reference.

TECHNICAL FIELD

The present invention relates to an order terminal such as a handy terminal or a commodity sales data processing apparatus included in an order entry system, a computer-readable storage medium that stores a computer program for order terminal, and an order method.

BACKGROUND

Stores such as a family restaurant and a food court may install an order entry system. In using the order entry system, a customer tells menu items that the customer is about to order to a customer attendant. The customer attendant inputs menu codes for specifying the menu items to an order terminal such as a handy terminal. The handy terminal generates order data (including a table code and menu codes) on the basis of the input menu codes and transmits the generated order data to an order station. The order station issues an order for printing and issuing an order slip to a kitchen printer and transmits the order data to a point of sale ("POS") terminal.

Some customer cannot take certain food and drink. Such food and drink include an egg as an allergen that causes an allergy and a pork meat that people are not allowed to eat under a religious doctrine. However, it is difficult to determine whether food and drink contain such raw materials just looking at menu items as finished products. Therefore, the customer asks the customer attendant whether raw materials that the customer cannot take are included in menu items that the customer is about to order.

The customer attendant often does not know which raw materials are contained in the menu items that the customer is about to order. Therefore, the customer attendant leaves his or her post, goes to the kitchen, and asks a cook the same question. Thereafter, if the customer attendant is given an answer, the customer attendant returns to the post and answers the question of the customer.

Such work causes a large time loss and keeps the customer waiting for a long time. Therefore, family restaurants, food courts, and the like desire to easily realize operation for rejecting an order of a menu item containing a raw material that a customer cannot take.

JP-A-2006-79209 discloses a technique for displaying menu items not containing allergens on the basis of allergy information registered for each of customers. However, in the technique disclosed in JP-A-2006-79209, it is necessary to collect allergy information from customers and register the allergy information in advance. Therefore, the technique prevents flexible customer service.

SUMMARY

It is an object of the present invention to facilitate operation for rejecting an order of a menu item containing a raw material that a customer cannot take.

According to an aspect of the present invention, there is provided an order terminal including: an operation input unit for inputting information; a display unit that displays the information; and a control unit for executing first processing for allowing a user to designate a desired raw material with the operation input unit, second processing for causing the display unit to display menu items not containing the designated raw material, and third processing for allowing the user to designate a desired menu item with the operation input unit from the menu items displayed on the display unit and generating order data including the designated menu item.

According to another aspect of the present invention, there is provided a computer-readable recording medium including a computer program for causing a computer to execute: first processing for allowing a user to designate a desired raw material with an operation input unit for inputting information; second processing for causing a display unit for displaying information to display menu items not containing the designated raw material; and third processing for allowing the user to designate a desired menu item with the operation input unit from the menu items displayed on the display unit and generating order data including the designated menu item.

According to still another aspect of the present invention, there is provided an order method including: allowing a user to designate a desired raw material with an operation input unit for inputting information; causing a display unit for displaying information to display menu items not containing the designated raw material; and allowing the user to designate a desired menu item with the operation input unit from the menu items displayed on the display unit and generating order data including the designated menu item.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 is a schematic diagram of data structure of a menu master;

FIG. 9 is a flowchart of a flow of allergen display processing;

FIG. 10A is a schematic diagram of a screen example (a menu item screen included in a host menu) of the LCD of the handy terminal during the allergen display processing;

FIG. 10B is a schematic diagram of a screen transition example (a screen of a list of allergens included in millefeuille) of the LCD displayed when millefeuille is touch-designated in the screen shown in FIG. 10A;

FIG. 11 is a flowchart of a flow of allergen search processing;

FIG. 12A is a schematic diagram of a screen example (an allergen display screen) of the LCD of the handy terminal during the allergen search processing;

FIG. 12B is a schematic diagram of a screen transition example (a display screen of selected allergens) of the LCD displayed when "wheat" and "shrimp" as allergens are touch-designated in the screen shown in FIG. 11A;

FIG. 14 is a flowchart of another example of the flow of the allergen search processing;

FIG. 15A is a screen example of an LCD of the POS terminal during the allergen display processing;

FIG. 15B is a schematic diagram of a screen transition example (an allergen list screen) of the LCD displayed when a specific host menu is touch-designated in the screen shown in FIG. 15A;

FIG. 16A is a schematic diagram of a screen transition example (a display screen for selected allergens) of the LCD displayed when "soba", "egg", and "peanuts" are touch-designated in the screen shown in FIG. 15B; and FIG. 16B is a schematic diagram of a screen transition example of the LCD that displays menu items included in a host menu "drink" when "soba", "egg", and "peanuts" as allergens are touch-designated in the screen shown in FIG. 16A.

DETAILED DESCRIPTION

First Embodiment

A first embodiment of the present invention is explained with reference to FIGS. 1 to 14.

Figure 1:
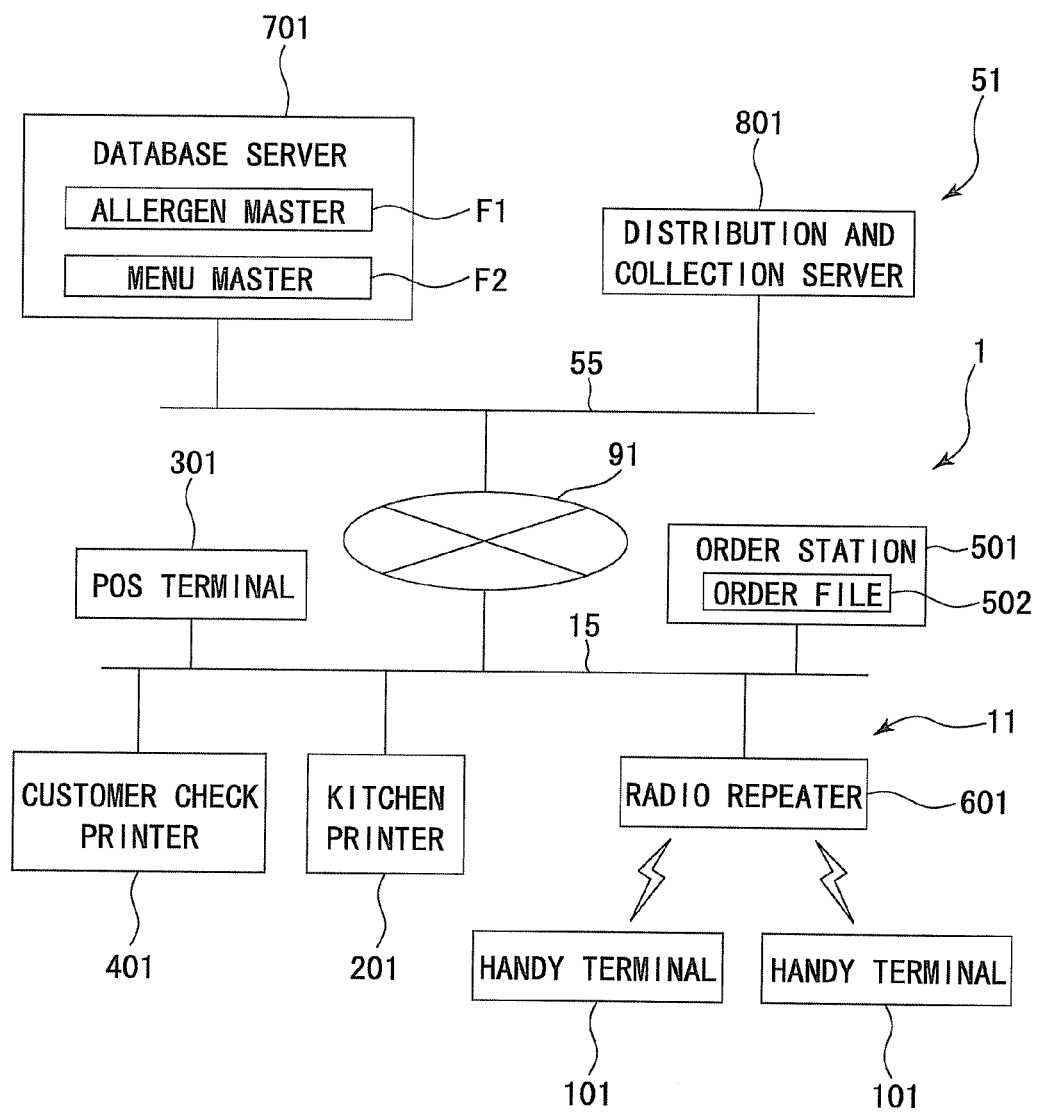
FIG. 1 is a schematic system diagram of an order entry system.

FIG. 1 is a schematic system diagram of an order entry system 1. The order entry system 1 according to the first embodiment is used in, for example, a family restaurant and includes a store system 11 installed in a store and a head office system 51 installed in a head office that administers stores. A POS terminal 301, an order station 501, a kitchen printer 201, and a customer check printer 401 included in the store system 11 are connected via a communication cable 15 to be capable of performing data communication with one another. A radio repeater 601 included in the store system 11 is connected to the communication cable 15 and set on a ceiling of the store. A handy terminal 101 included in the store system 11 is connected to the POS terminal 301, the order station 501, the kitchen printer 201, and the customer check printer 401 via the radio repeater 601 to be capable of performing data communication by radio. Such a store system 11 is connected to the head office system 51 via a network 91. A database server 701, a distribution and collection server 801, an enterprise application integration ("EAI") server (not shown in the figure), and a journal server (not shown in the figure) included in the head office system 51 are connected via a communication cable 55 to be capable of performing data communication with one another. A hard disk drive ("HDD") (not shown in the figure) of the database server 701 stores an allergen master F1 and a menu master F2. Details of the allergen master F1 and the menu master F2 are explained later. The allergen master F1 and the menu master F2 are delivered from the database server 701 to the store system 11 by the distribution and collection server 801 via the network 91.

The allergen master F1 and the menu master F2 delivered to the store system 11 are first delivered to the POS terminal 301 and stored in a HDD 365 (see FIG. 3) of the POS terminal 301, also delivered to the order station 501 by the POS terminal 301, and stored in a HDD (not shown in the figure) of the order station 501. The allergen master F1 and the menu master F2 are also delivered to the handy terminal 101 via the radio repeater 601. Specifically, a microcomputer 151 (see FIG. 5) of the handy terminal 101 executes communication with the POS terminal 301 via the radio repeater 601 according to power-on, receives the allergen master F1 and the menu master F2 from the POS terminal 301, and causes a random access memory ("RAM") 155 (see FIG. 5) of the handy terminal 101 to store the allergen master F1 and the menu master F2.

Figure 2:
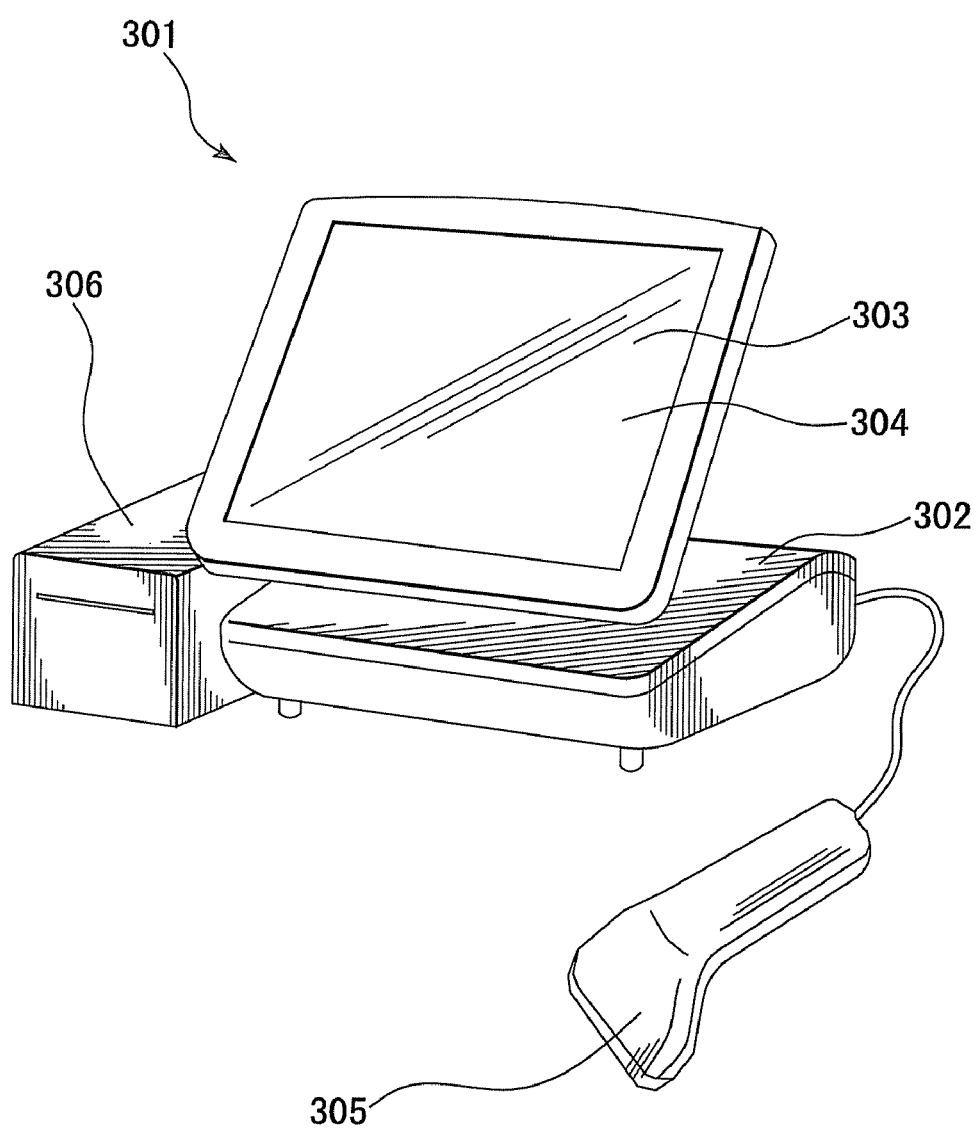
FIG. 2 is an external perspective view of a POS terminal.

FIG. 2 is an external perspective view of the POS terminal 301. The POS terminal 301 has a thin flat housing 302. The housing 302 has an LCD 303 on an upper surface thereof. The LCD 303 provides a checkout clerk, who uses the POS terminal 301, with information display. A touch panel 304 is stacked on and attached to a display surface of the LCD 303. The POS terminal 301 includes a code scanner 305 that reads a code symbol of a barcode or the like and decodes the code symbol and a receipt printer 306 that prints information on a receipt sheet and issues the information as a receipt. A card reader 307 (see FIG. 3) and a drawer 308 (see FIG. 3) are connected to the POS terminal 301.

Figure 3:
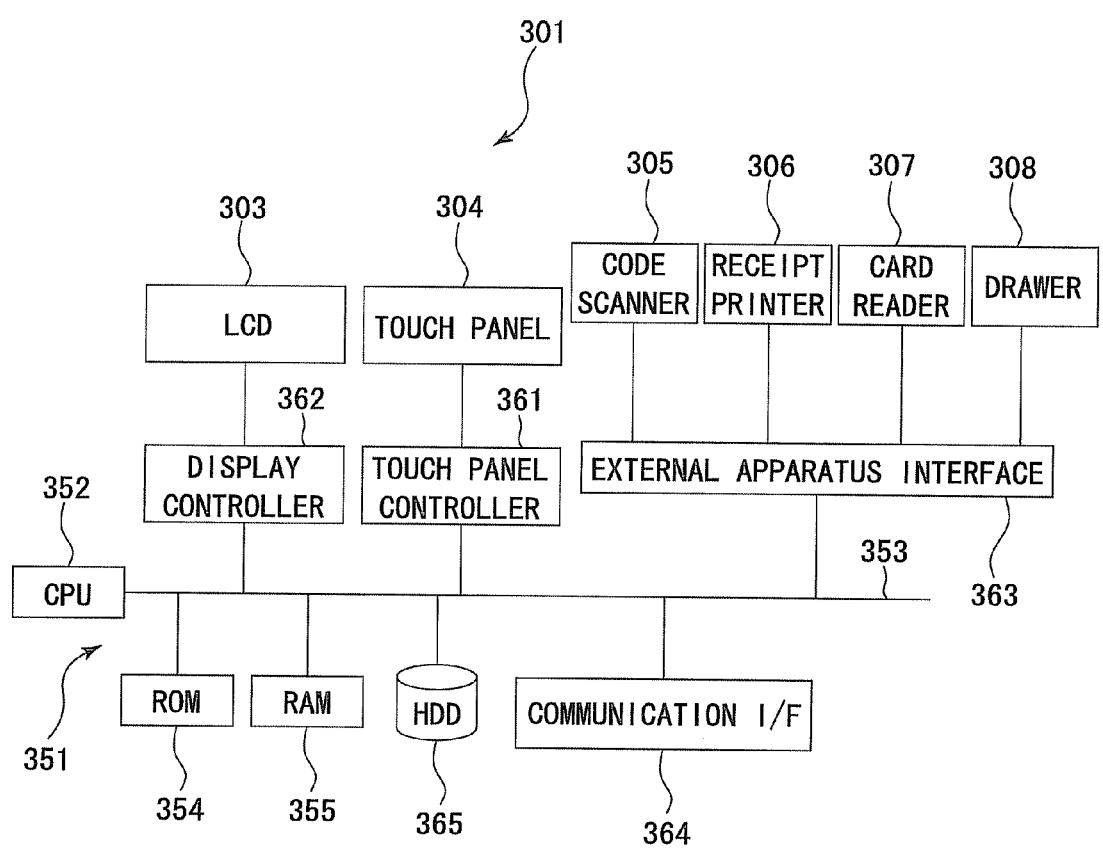
FIG. 3 is a block diagram of electric connection of the POS terminal.

FIG. 3 is a block diagram of electric connection of the POS terminal 301. The POS terminal 301 includes a microcomputer 351 that controls to drive units of the POS terminal 301. The microcomputer 351 includes a central processing unit ("CPU") 352, a read only memory ("ROM") a 354, and a RAM 355. The ROM 354 stores stationary information such as a control program in advance. The RAM 355 rewritably stores various data. The CPU 352, the ROM 354, and the RAM 355 are connected via a bus line 353. A touch panel controller 361 that captures an input signal from the touch panel 304 into the microcomputer 351, a display controller 362 that controls to drive the LCD 303 on the basis of image data and causes the LCD 303 to display an image corresponding to the image data, an external apparatus interface 363 that controls the code scanner 305, the receipt printer 306, the card reader 307, and the drawer 308, a communication interface 364 that enables data communication with the kitchen printer 201, the customer check printer 401, the order station 501, and the radio repeater 601 via the communication cable 15, and the HDD 365 are connected to the microcomputer 351 via the bus line 353. The HDD 365 stores the allergen master F1 and the menu master F2 delivered from the database server 701 of the head office system 51 by the distribution and collection server 801.

The order station 501 includes a microcomputer. A HDD and a communication interface are connected to the microcomputer via a bus line (all of which are not shown in the figure). The communication interface enables data communication with the kitchen printer 201, the POS terminal 301, the customer check printer 401, and the radio repeater 601 via the communication cable 15. The HDD stores the allergen master F1 and the menu master F2 delivered from the database server 701 by the distribution and collection server 801. The HDD also stores an order file 502 (see FIG. 1) in which order data transmitted from the handy terminal 101 is stored.

Figure 4:
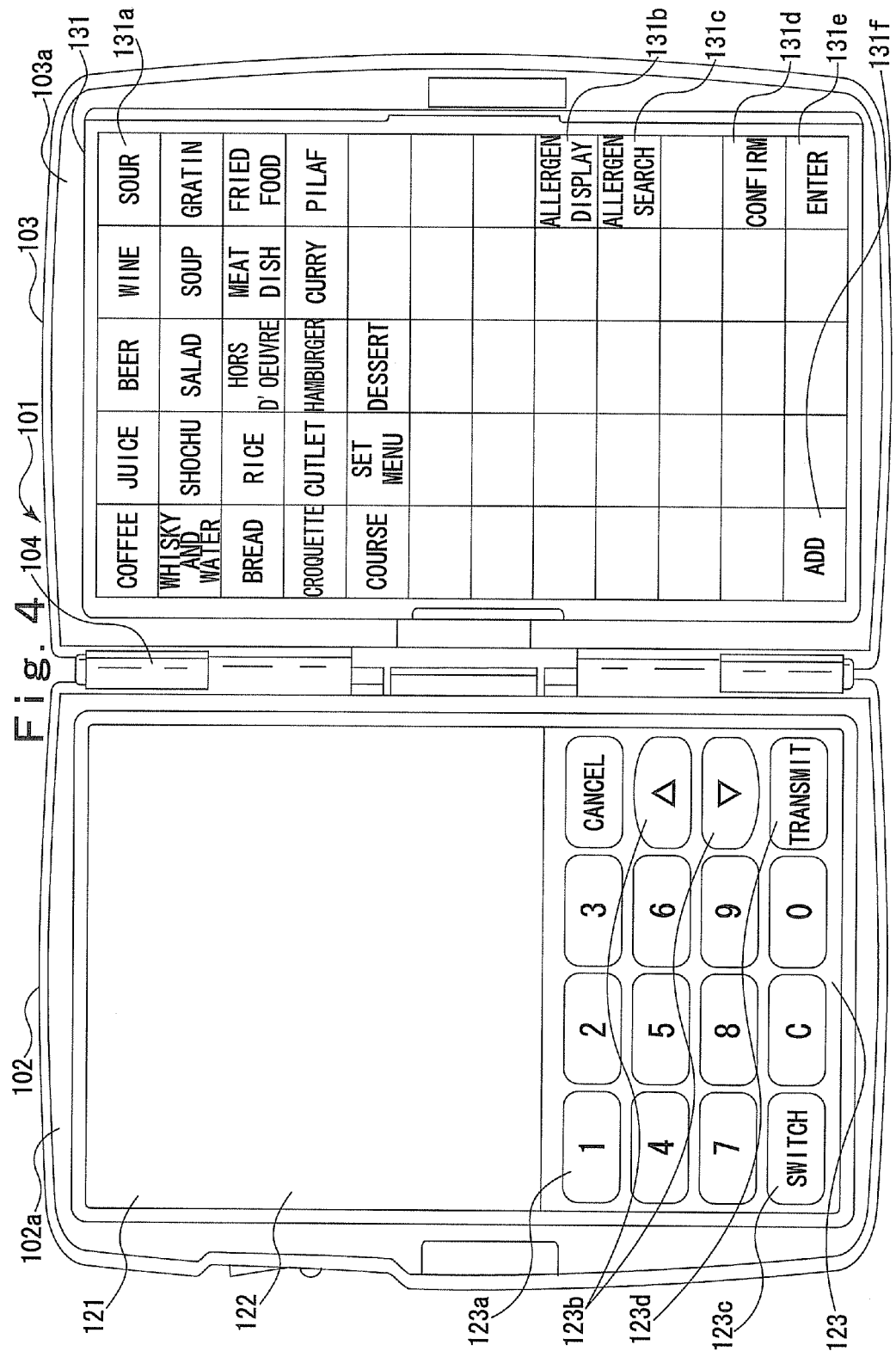
FIG. 4 is a front view of a handy terminal.

FIG. 4 is a front view of the handy terminal 101. The handy terminal 101 includes a left unit 102 and a right unit 103. The left unit 102 and the right unit 103 are coupled by hinges 104 to freely pivot to open and close. A housing 102a of the left unit 102 includes an LCD 121. In the LCD 121, a touch panel 122 is stacked and provided on a display surface thereof. A key sheet 123 is provided to be superimposed on the touch panel 122 in a section on a lower stage side (on a lower side in FIG. 4) of the touch panel 122. The key sheet 123 includes a ten key 123a that displays numbers, arrow keys 123b that display up and down arrows, and a transmission key 123d indicated as "transmission". In a housing 103a of the right unit 103, a keyboard 131 having plural keys is provided. The keys include plural host menu keys 131a on which characters indicating host menus such as "salad" are printed, an allergen display key 131b on which characters "allergen display" are printed, an allergen search key 131c on which characters "allergen search" are printed, a confirmation key 131d on which characters "confirm" are printed, an enter key 131e on which characters "Enter" are printed, and an addition key 131f on which characters "add" are printed.

Figure 5:
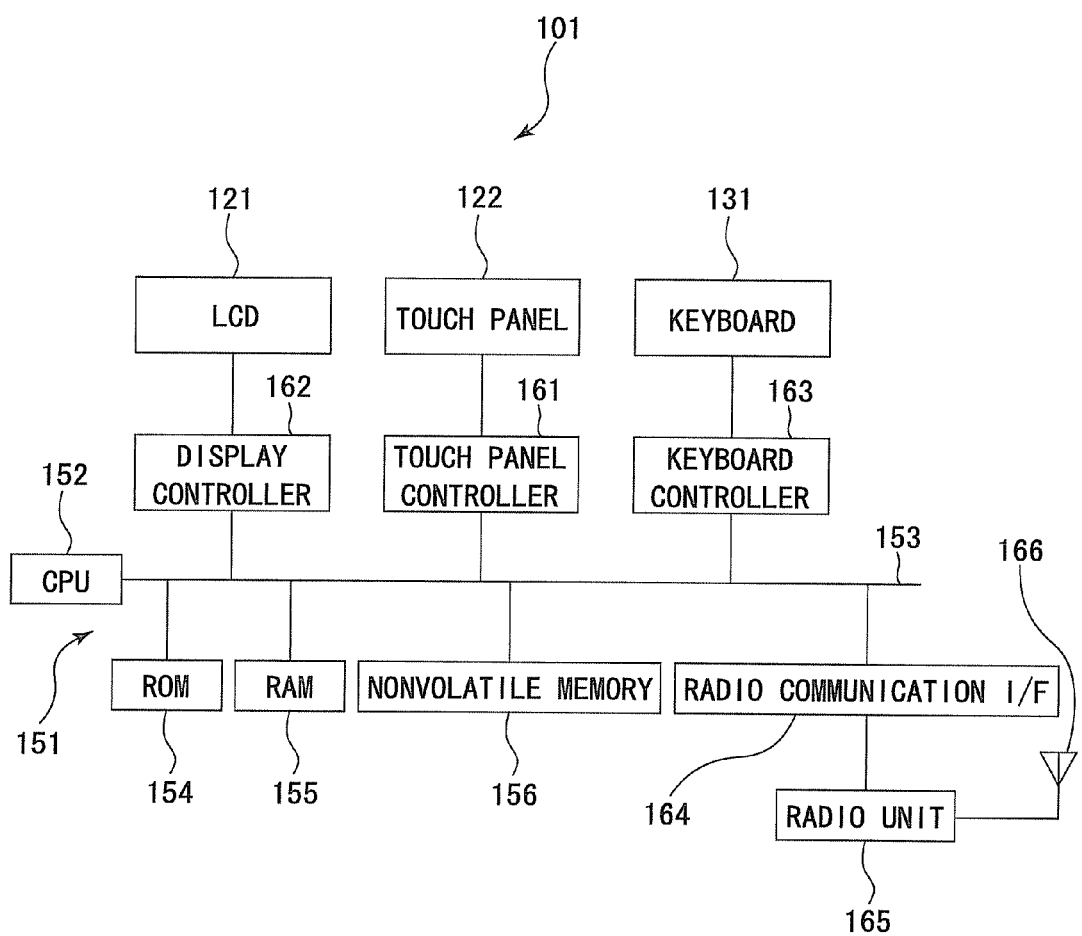
FIG. 5 is a block diagram of electric connection of the handy terminal.

FIG. 5 is a block diagram of electric connection of the handy terminal 101. The handy terminal 101 includes the microcomputer 151 that controls to drive units of the handy terminal 101. The microcomputer 151 includes a CPU 152, a ROM 154, and the RAM 155. The ROM 154 stores stationary information such as a computer program in advance. The RAM 155 rewritably stores various data. The ROM 154 and the RAM 155 are connected to the CPU 152 via a bus line 153. A touch panel controller 161 that captures an input signal from the touch panel 122 into the microcomputer 151, a display controller 162 that controls to drive the LCD 121 on the basis of image data and causes the LCD 121 to display an image corresponding to the image data, a keyboard controller 163 that captures an input signal from the keyboard 131 into the microcomputer 151, and a radio communication interface 164 that controls to drive a radio unit 165 are connected to the microcomputer 151 via the bus line 153. The radio unit 165 executes radio communication with the radio repeater 601 via an antenna 166. The handy terminal 101 generates various kinds of information such as order data and transmits the information from the radio unit 165 to the radio repeater 601. The RAM 155 of the handy terminal 101 stores the allergen master F1 and the menu master F2 delivered from the POS terminal 301 via the radio repeater 601.

Figure 6:
FIG. 6 is a schematic diagram of data structure of an allergen master.

FIG. 6 is a schematic diagram of data structure of the allergen master F1. The allergen master F1 is a file that stores data of names of allergens (allergen names). Precisely, an allergen indicates a substance (an antigen) itself that specifically reacts with an antibody of a person who has an allergosis to cause allergy. However, in this embodiment, the allergen indicates raw materials ("wheat", etc.) of food and drink containing the antigen. The allergen master F1 stores "allergen name" in association with "allergen code" allocated to each of the allergens. For example, the allergen master F1 stores "egg" in association with "allergen code: 3". Therefore, "egg" can be specified on the basis of "allergen code: 3" by referring to the allergen master F1. Data stored in the allergen master F1 is not limited to allergen names. Other raw materials of food and drink may be stored. For example, raw materials that people are not allowed to eat under a religious doctrine.

FIG. 7 is a schematic diagram of data structure of the menu master F2. The menu master F2 stores "menu item" in association with "menu code" allocated to each "menu item". Therefore, "menu item" can be specified on the basis of "menu code" by referring to the menu master F2. The menu master F2 also stores, in association with "menu code", "unit price" concerning "menu item" specified by the "menu code", "allergen code" for specifying allergens contained in food and drink related to the "menu item", and "host menu" to which the "menu item" belongs. Both the allergen master F1 and the menu master F2 store "allergen code" as information.

Order entry processing is explained below. The microcomputer 151 of the handy terminal 101 causes the RAM 155 to store a table code input by touch-designation of the ten key 123a. Subsequently, the microcomputer 151 acquires, according to depression and determination of the host menu key 131a, data of "menu code" and "menu item" corresponding to the host menu key 131a from the menu master F2 and causes the LCD 121 to display menu items 121a (see FIG. 8). The microcomputer 151 allocates corresponding menu codes to the menu items 121a.

Figure 8:
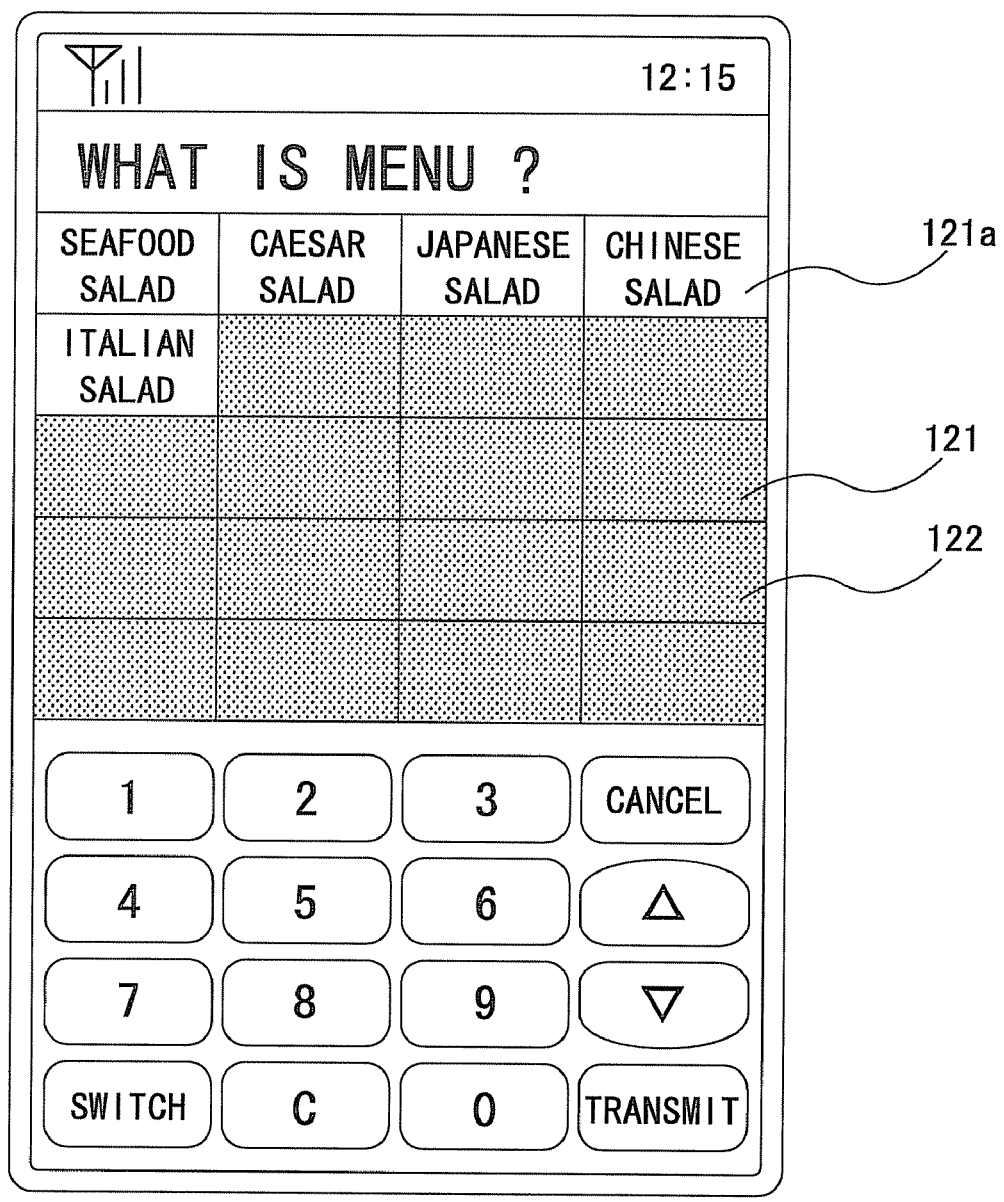
FIG. 8 is a schematic diagram of a screen example of a liquid crystal display ("LCD") in a state in which menu items are displayed.

FIG. 8 is a schematic diagram of a screen example of the LCD 121 in a state in which the menu items 121a are displayed. The respective menu items 121a are surrounded by frames of a square shape. In FIG. 8, the menu items 121a associated with the host menu key 131a "salad" are displayed. In this case, the menu items 121a are indicated by character strings such as "seafood salad". "Menu code" for specifying "seafood salad" is allocated to the menu item 121a indicated as "seafood salad". When the menu item 121a is touch-designated, the microcomputer 151 inputs a menu code of the touch-designated menu item 121a. The microcomputer 151 causes the RAM 155 to store the input menu code.

The microcomputer 151 generates order data according to the determination of entry designation and transmits the order data by radio through the radio unit 165 with a transmission destination set as the order station 501. The entry designation is executed according to the depression of the enter key 131e and the touch-designation of the transmission key 123d. The order data includes a table code stored in the RAM 155 and all menu codes stored in the RAM 155. The order data further includes allergen codes. Therefore, the allergen codes are stored in the RAM 155 of the handy terminal 101. The allergen codes are included in order data to be generated and transmitted. The table code may be a seat code for specifying a seat.

The order station 501 receives the order data transmitted by radio. When the order station 501 determines that the order data is received, the order station 501 registers the order data in the order file 502 with a serial order number affixed thereto as an identification number and transmits the order data to the kitchen printer 201 and the customer check printer 401. The customer check printer 401 prints and issues a checkout slip on the basis of the received order data. The order number for specifying the order data is printed on the checkout slip in a form of a code symbol. The kitchen printer 201 executes processing same as that executed by the customer check printer 401.

A customer attendant carries the checkout slip to a table of a customer. When the customer finishes dining, the customer carries the checkout slip to a checkout counter on which the POS terminal 301 is arranged. The POS terminal 301 executes checkout processing. In the checkout processing, when a checkout clerk causes the code scanner 305 to read the order number printed on the checkout slip, the microcomputer 351 of the POS terminal 301 executes data communication with the order station 501, invokes the order data specified by the read order number from the order file 502, and causes the RAM 355 to store the order data. The microcomputer 351 executes commodity sales data processing on the basis of the order data with reference to the menu master F2.

FIG. 9 is a flowchart of a flow of allergen display processing. FIG. 10A is a schematic diagram of a screen example (a menu item screen included in a host menu) of the LCD of the handy terminal during the allergen display processing. FIG. 10B is a schematic diagram of a screen transition example (a screen of a list of allergens included in millefeuille) of the LCD displayed when millefeuille is touch-designated in the screen shown in FIG. 10A.

When the microcomputer 151 determines that the allergen display key 131b is depressed (Y in ACT 1), the microcomputer 151 stands by for depression of the host menu key 131a (ACT 2). The microcomputer 151 acquires, according to the depression of the host menu key 131a (Y in ACT 2), data of "menu code" and "menu item" corresponding to the host menu key 131a from the menu master F2 stored in the RAM 155 of the microcomputer 151 (ACT 3) and causes the LCD 121 to display the menu item 121a as shown in FIG. 10A (ACT 4). The microcomputer 151 allocates a corresponding menu code to the menu item 121a.

Subsequently, the microcomputer 151 stands by for touch-designation of the menu item 121a (ACT 5). Menu codes are allocated to the menu items 121a. Therefore, when the menu item 121a is touch-designated, a menu code is input to the microcomputer 151. When the menu code is input by the touch-designation of the menu item 121a (Y in ACT 5), the microcomputer 151 searches through the menu master F2 on the basis of the input menu code and determines whether allergen codes are stored in association with the menu code (ACT 6). When the microcomputer 151 determines that allergen codes are stored (Y in ACT 6), the microcomputer 151 acquires the allergen codes (ACT 7), searches through the allergen master F1 on the basis of the acquired allergen codes, and acquires allergen names stored in association with the allergen codes (ACT 8). As shown in FIG. 10B, the microcomputer 151 causes the LCD 121 to display the acquired allergen names 141 (ACT 9). The allergen names 141 are surrounded by rectangular frames long in the left to right direction.

The menu master F2 stores "3 and 4" as "allergen code" in association with "millefeuille". Therefore, as shown in FIG. 10B, the microcomputer 151 displays "egg" specified by "allergen code: 3" and "milk" specified by "allergen code: 4" on the LCD 121 as the allergen names 141. The microcomputer 151 ends the allergen display processing according to determination of the depression of the confirmation key 131d (Y in ACT 10).

FIG. 11 is a flowchart of a flow of allergen search processing. FIG. 12A is a schematic diagram of a screen example (an allergen display screen) of the LCD of the handy terminal during the allergen search processing. FIG. 12B is a schematic diagram of a screen transition example (a display screen of selected allergens) of the LCD displayed when "wheat" and "shrimp" as allergens are touch-designated in the screen shown in FIG. 11A.

When the microcomputer 151 determines that the allergen search key 131c is depressed (Y in ACT 21), the microcomputer 151 acquires all data of "allergen name" from the allergen master F1 (ACT 22) and causes the LCD 121 to display the allergen names 141 as shown in FIG. 12A (ACT 23). The microcomputer 151 also acquires data of "allergen code" from the allergen master F1 and allocates corresponding allergen codes to the allergen names 141 displayed on the LCD 121. Since all the allergen names 141 cannot be displayed on the LCD 121, the microcomputer 151 displays a next page key 126 including a character string "next page" in a position below the allergen names 141. The microcomputer 151 displays the remaining allergen names 141 on the LCD 121 according to touch-designation of the next page key 126. When the allergen name 141 is touch-designated (Y in ACT 24), the microcomputer 151 causes the RAM 155 to store an allergen code allocated to the touch-designated allergen name 141 (ACT 25). As shown in FIG. 12B, the microcomputer 151 displays an "x" mark in a frame surrounding the touch-designated allergen name 141. Consequently, the touch-designated allergen name 141 can be clearly discriminated. The processing in ACT 24 and ACT 25 is executed until the enter key 131e is depressed (Y in ACT 26). In other words, it is possible to touch-designate plural allergen names 141 (Y in ACT 24) and cause the RAM 155 to store allergen codes (ACT 25). When the microcomputer 151 determines that the enter key 131e is depressed (Y in ACT 26), the microcomputer 151 shifts to order entry processing (ACT 27). In the order entry processing executed after the allergen search processing, compared with the order entry processing executed without the allergen search processing, a part of details of processing is different. Specifically, processing in acquisition of the menu items 121a from the menu master F2 and display of the menu items 121a on the LCD 121 is different.

Figure 13:
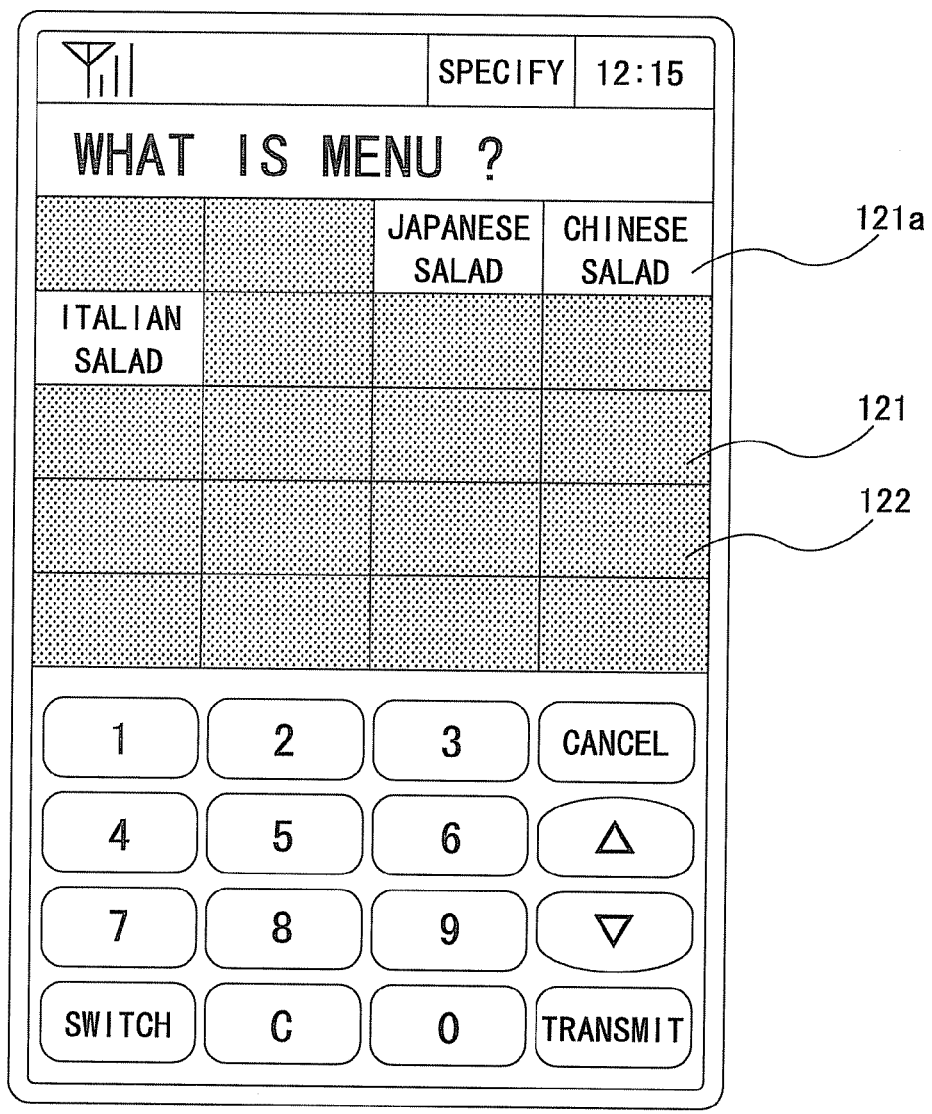
FIG. 13 is a schematic diagram of a screen example of the LCD in a state in which menu items are displayed in order entry processing executed after the allergen search processing.

FIG. 13 is a schematic diagram of a screen example of the LCD 121 in a state in which the menu items 121a are displayed in the order entry processing executed after the allergen search processing. In the following explanation, the allergen names 141 "wheat" and "shrimp" are touch-designated (ACT 24) and allergen codes of "wheat" and "shrimp" are stored in the RAM 155 (ACT 25) in the allergen search processing. In this case, when the microcomputer 151 determines that the host menu key 131a "salad" is depressed, the microcomputer 151 acquires data of "menu code" and "menu item" concerning "Japanese salad", "Chinese salad", and "Italian salad" not stored in association with the allergen codes of "wheat" and "shrimp" from the menu master F2 and causes the LCD 121 to display only the acquired menu items 121a as shown in FIG. 13. The microcomputer 151 allocates a corresponding menu code to only the menu items 121a displayed by the LCD 121. As shown in FIG. 13, the microcomputer 151 does not cause the LCD 121 to display the menu items 121a not acquired from the menu master F2. The microcomputer 151 causes the LCD 121 to display a color (e.g., gray) different from a color in frames in which the menu items 121a are displayed. Menu codes are not allocated to frames in which the menu items 121a are not displayed. Therefore, even if the frames are touch-designated on the touch panel 122, menu codes are not input to the microcomputer 151. In this way, concerning menu items containing allergens designated to be excluded by the allergen search processing, menu codes cannot be input in the handy terminal 101. The menu codes are not stored in the RAM 155 and included in order data.

FIG. 14 is a flowchart of another example of the flow of the allergen search processing. When the microcomputer 151 determines that the allergen search key 131c is depressed (Y in ACT 31) and then determines that the allergen display key 131b is depressed (Y in ACT 32), the microcomputer 151 stands by for depression of the host menu key 131a (ACT 33). According to the depression of the host menu key 131a (Y in ACT 33), the microcomputer 151 acquires data of "menu code" and "menu item" corresponding to the host menu key 131a from the menu master F2 (ACT 34) and causes the LCD 121 to display the menu item 121a with a corresponding menu code allocated thereto (ACT 35). When a menu code is input according to the touch on the menu item 121a (Y in ACT 36), the microcomputer 151 searches through the menu master F2 on the basis of the input menu code and determines whether an allergen code is stored in association with the menu code (Act 37). When an allergen code is stored (Y in ACT 37), the microcomputer 151 acquires the allergen code (ACT 38), searches through the allergen master F1 on the basis of the acquired allergen code, acquires the allergen names and allergen codes stored in association with the allergen code (ACT 39), and causes the LCD 121 to display the acquired allergen names 141 (ACT 40). The microcomputer 151 allocates the acquired allergen codes to the allergen names 141 displayed by the LCD 121. When the allergen name 141 is touch-designated (Y in ACT 41), the microcomputer 151 causes the RAM 155 to store the allergen code allocated to the touch-designated allergen name 141 (ACT 42). When the microcomputer 151 determines that the enter key 131e is depressed (Y in ACT 43), the microcomputer 151 shifts to order entry processing (ACT 44). In the order entry processing executed in this case, as in the allergen search processing, concerning menu items containing allergens designated to be excluded by the allergen search processing, menu codes cannot be input in the handy terminal 101. The menu codes are not stored in the RAM 155 and included in order data.

An additional order performed by the handy terminal 101 is explained. After determining that the addition key 131f is depressed, when a table code for specifying a table where a customer who makes an additional order is seated is input, the microcomputer 151 of the handy terminal 101 causes the RAM 155 to store data of the input table code. The microcomputer 151 executes communication with the order station 501 via the radio repeater 601, executes processing for invoking order data corresponding to the table code stored in the RAM 155 from the order file 502, and causes the RAM 155 to store an allergen code included in the invoked order data. Thereafter, the microcomputer 151 shifts to order entry processing. In the order entry processing to be executed, since the allergen code is stored in the RAM 155, the menu item 121a not associated with the allergen code is acquired from the menu master F2 and only the acquired menu item 121a is displayed on the LCD 121. In this case, the microcomputer 151 does not execute the allergen search processing again in an additional order. Concerning menu items containing allergens designated to be excluded by the last allergen search processing, menu codes cannot be input in the handy terminal 101. The menu codes are not stored in the RAM 155 and included in order data. In this way, convenience in an additional order is improved.

Second Embodiment

A second embodiment of the present invention is explained with reference to FIGS. 15A, 15B, 16A, and 16B. Components same as those in the first embodiment are denoted by the same reference numerals and sings and explanation of the components is omitted. The order entry system 1 according to the second embodiment is installed and used in a store (e.g., a food court) that receives orders from customers with the POS terminal 301. In the second embodiment, the microcomputer 351 executes the order entry processing, the allergen display processing (see FIG. 9), the allergen search processing (see FIGS. 11 and 14), and the processing in additional order. These kinds of processing are not substantially different from those in the first embodiment except that the microcomputer 351 executes the processing. Therefore, explanation of details of the processing is omitted.

Figure 15A:
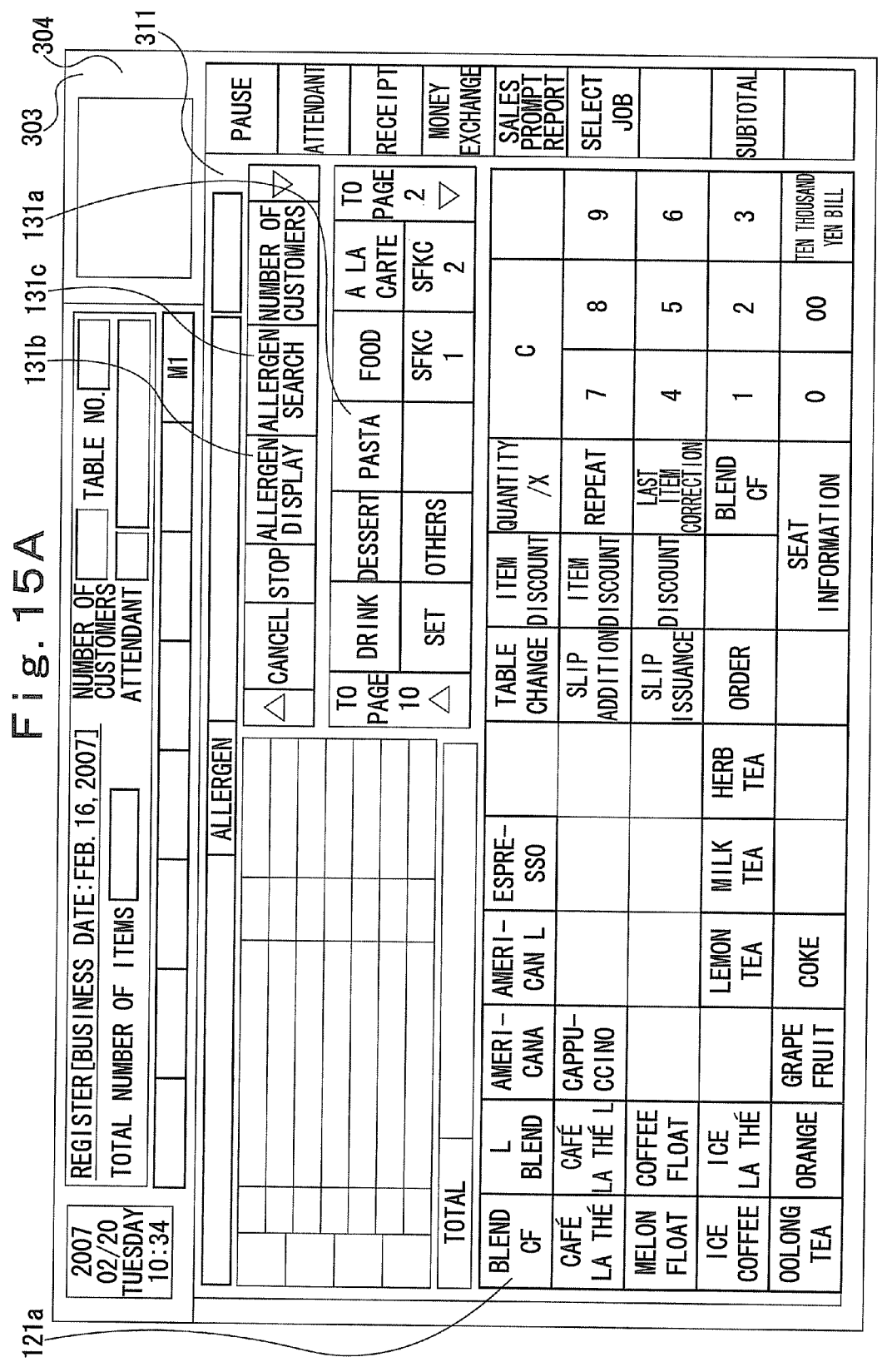

FIGS. 15A and 15B are screen examples of the LCD 303 of the POS terminal 301 during the allergen display processing. The allergen display processing executed in the POS terminal 301 is explained with reference to FIG. 9 to FIGS. 15A and 15B. As shown in FIG. 15A, an order entry screen 311 including plural key indications is displayed on the LCD 303 of the POS terminal 301. The order entry screen 311 includes the host menu keys 131a, the allergen display key 131b, and the allergen search key 131c. When the microcomputer 351 determines that the allergen display key 131b is touch-designated (Y in ACT 1), the microcomputer 351 stands by for depression of the host menu key 131a (ACT 2). According to the depression of the host menu key 131a (Y in ACT 2), the microcomputer 351 acquires data of "menu code" and "menu item" corresponding to the host menu key 131a from the menu master F2 (ACT 3) and causes the order entry screen 311 to display the menu items 121a as shown in FIG. 15A (ACT 4). The microcomputer 351 allocates corresponding menu codes to the menu items 121a.

Subsequently, when a menu code is input according to the touch on the menu item 121a (Y in ACT 5), the microcomputer 351 searches through the menu master F2 on the basis of the input menu code and determines whether an allergen code is stored in association with the menu code (Act 6). When an allergen code is stored (Y in ACT 6), the microcomputer 351 acquires the allergen code (ACT 7), searches through the allergen master F1 on the basis of the acquired allergen code, acquires the allergen names 141 stored in association with the allergen code (ACT 8). As shown in FIG. 15B, the microcomputer 351 causes the LCD 303 to display the acquired allergen names 141 (ACT 9). As shown in FIG. 15B, the allergen names 141 are displayed as a list in a window 145 popup-displayed to be superimposed on the order entry screen 311. The window 145 includes the confirmation key 131d. According to touch-designation of the confirmation key 131d (Y in ACT 10), the microcomputer 351 eliminates the popup-displayed window 145 and ends the allergen display processing.

Figure 16B:
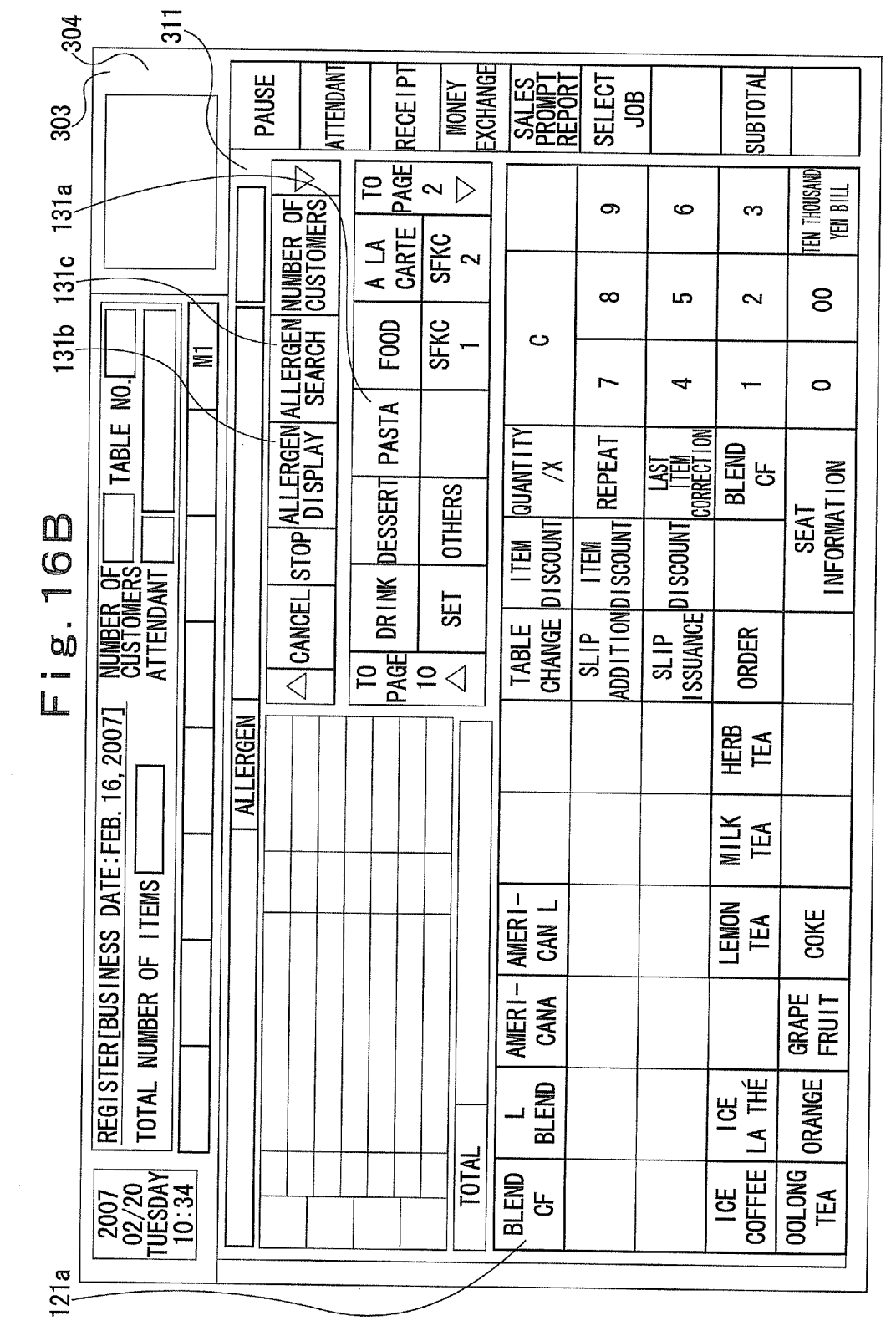

FIGS. 16A and 16B are screen examples of the LCD 303 of the POS terminal 301 during the allergen search processing. The allergen search processing executed in the POS terminal 301 is explained with reference to FIG. 11 to FIGS. 16A and 16B. When the microcomputer 351 determines that the allergen search key 131c is touch-designated (Y in ACT 21), the microcomputer 351 acquires all data of "allergen name" from the allergen master F1 (ACT 22) and causes the LCD 303 to display the allergen names 141 (ACT 23). As shown in FIG. 16A, the allergen names 141 are displayed as a list in the window 145 popup-displayed to be superimposed on the order entry screen 311. The microcomputer 351 also acquires data of "allergen code" from the allergen master F1 and allocates corresponding allergen codes to the allergen names 141.

When the allergen name 141 is touch-designated (Y in ACT 24), the microcomputer 351 causes the RAM 355 to store the allergen code allocated to the touch-designated allergen name 141 (ACT 25). As shown in FIG. 16A, an "x" mark is displayed on the window 145 in association with the touch-designated allergen name 141. Further, a color in a frame surrounding the touch-designated allergen name 141 changes to a color different from a color in frames surrounding the allergen names 141 not touch-designated. This makes it possible to clearly discriminate the touch-designated allergen name 141. When the microcomputer 351 determines that the confirmation key 131d provided instead of the enter key 131e is depressed (Y in ACT 26), the microcomputer 351 eliminates the window 145 and shifts to the order entry processing (ACT 27).

In the order entry processing to be executed in this case, as in the allergen search processing, the menu item 121a not associated with the allergen code stored in the RAM 355 is acquired from the menu master F2 and only the acquired menu item 121a is displayed on the order entry screen 311 as shown in FIG. 16B. Compared with the order entry screen 311 shown in FIG. 15A, a part of the menu items 121a is not included. Consequently, concerning menu items containing allergens designated to be excluded by the allergen search processing, menu codes cannot be input in the POS terminal 301. The menu codes are not stored in the RAM 355 and included in order data.

According to this embodiment, when a raw material is designated according to a request of a customer, a menu item containing the designated raw material is not displayed on the display unit. Therefore, the menu item is not designated by operation in the operation input unit and a menu code for specifying the menu item is not included in order data. Therefore, it is possible to facilitate operation for rejecting an order of a menu item containing a raw material that a customer cannot take.

Obviously, numerous modifications and variations of the present invention are possible in light of the above teachings. It is therefore to be understood that within the scope of the appended claims, the invention may be practiced otherwise than as specifically described herein.

What is claimed is:

1. An order terminal comprising:
an operation input unit for inputting information;
a display unit that displays the information; and
a control unit for executing:
first processing for allowing a user to designate a first menu item, searching for a first raw material included in the designated first menu item, displaying the searched first raw material on the display unit, and allowing the user to designate the displayed first raw material with the operation input unit;
second processing for causing the display unit to display predetermined kinds of raw materials including the first raw material and a raw material other than the first raw material, and allowing the user to designate a second raw material among the displayed predetermined kinds of raw materials;
third processing for causing the display unit to display a second menu item not containing the first raw material designated in the first processing and the second raw material designated in the second processing;
fourth processing for allowing the user to designate the second menu item with the operation input unit displayed on the display unit and generating order data including the designated second menu item; and
wherein the first raw material and the second raw material are allergens.

2. The order terminal of claim 1, wherein, in the second processing, the control unit displays the predetermined kinds of raw materials on the display unit and allows the user to selectively designate the second raw material with the operation input unit.

3. The order terminal of claim 1, wherein, in the third processing, the control unit searches for a menu code associated with a raw material code for specifying the designated first raw material and the designated second raw material with reference to menu data stored in a storage area with raw material codes for specifying raw materials and menu codes for specifying menu items associated with each other and selects a menu item to be displayed on the display unit.

4. A non-transitory computer-readable recording medium having a computer program stored thereon that, when executed by a computer, causes the computer to execute:
first processing for allowing a user to designate a first menu item, searching for a first raw material included in the designated first menu item, displaying the searched first raw material on the display unit, and allowing the user to designate the displayed first raw material with an operation input unit;
second processing for causing the display unit for displaying information to display predetermined kinds of raw materials including the first raw material and a raw material other than the first raw material, and allowing the user to designate a second raw material among the displayed predetermined kinds of raw materials;
third processing for causing the display unit to display a second menu item not containing the first raw material designated in the first processing and the second raw material designated in the second processing;
fourth processing for allowing the user to designate the second menu item with the operation input unit displayed on the display unit and generating order data including the designated second menu item; and
wherein the first raw material and the second raw material are allergens.

5. The non-transitory computer-readable recording medium of claim 4, wherein the computer program causes the computer to, in the second processing, display the predetermined kinds of raw materials on the display unit and allow the user to selectively designate the raw material with the operation input unit.

6. The non-transitory computer-readable recording medium of claim 4, wherein the computer program causes the computer to, in the third processing, search for a menu code associated with a raw material code for specifying the designated first raw material the designated second raw material with reference to menu data stored in a storage area with raw material codes for specifying raw materials and menu codes for specifying menu items associated with each other and select a menu item to be displayed on the display unit.

7. An order method comprising:
allowing a user to designate a first menu item, searching for a first raw material included in the designated first menu item, displaying the searched first raw material on the display unit, and allowing the user to designate the displayed first raw material with an operation input unit for inputting information;
causing a display unit for displaying information to display predetermined kinds of raw materials including the first raw material and a raw material other than the first raw material, and allowing the user to designate a second raw material among the displayed predetermined kinds of raw materials;
causing the display unit to display a second menu item not containing the first raw material designated in the first processing and the second raw material designated in the second processing;
allowing the user to designate the second menu item with the operation input unit displayed on the display unit and generating order data including the designated second menu item; and
wherein the first raw material and the second raw material are allergens.

8. The order method of claim 7, wherein, in the allowing the user to designate raw material, the predetermined kinds of raw materials are displayed on the display unit and the user is allowed to selectively designate the second raw material with the operation input unit.

9. The order method of claim 7, wherein, in the causing a display unit to display the second menu item, a menu code associated with a raw material code for specifying the designated first raw material and the designated second raw material is searched for with reference to menu data stored in a storage area with raw material codes for specifying raw materials and menu codes for specifying menu items associated with each other and, a menu item to be displayed on the display unit is selected.

* * * * *